United States Patent [19]

Landry et al.

[11] 4,015,130
[45] Mar. 29, 1977

[54] METHOD AND APPARATUS FOR MONITORING OPTICAL RADIATION

[75] Inventors: Robert Joseph Landry, Poolesville; Robert G. Bostrom; Richard W. Peterson, both of Rockville, all of Md.

[73] Assignee: The United States of America, Washington, D.C.

[22] Filed: Oct. 7, 1975

[21] Appl. No.: 620,375

[52] U.S. Cl. .................................. 250/372; 356/74
[51] Int. Cl.² .......................................... G01J 1/42
[58] Field of Search ............ 250/372; 356/74, 100, 356/176

[56] References Cited

UNITED STATES PATENTS

| | | | |
|---|---|---|---|
| 3,314,327 | 4/1967 | Killpatrick et al. | 356/176 |
| 3,572,933 | 3/1971 | Boostrom | 356/100 |
| 3,742,240 | 6/1973 | Jonasson | 250/372 |
| 3,851,970 | 12/1974 | Adler et al. | 250/372 X |

*Primary Examiner*—Davis L. Willis
*Attorney, Agent, or Firm*—Holman & Stern

[57] ABSTRACT

A method and apparatus for monitoring optical radiation which, in a preferred embodiment, takes the form of a biologically weighted ultraviolet radiant energy monitor which provides a direct indication of the hazards to humans from the ultraviolet radiant energy emanating from the optical radiation source being monitored. The source of radiation is first spectrally dispersed by passage through a suitable prism or diffraction grating. Portions of the spectrally dispersed radiation are mechanically masked in accordance with a predetermined biological weighting. The subsequent weighted output from the mechanical mask is then fed to a suitable detector. In the various embodiments of the ultraviolet hazard monitor, a quartz prism or diffraction grating spectrograph is utilized to spectrally disperse the incident radiation spatially and a plate coated with sodium salicylate or other suitable converter is placed in the exit plane of the spectrograph. The sodium salicylate plate fluoresces in the blue in response to incident ultraviolet radiation. The intensity of the biologically weighted blue light may then be conveniently and readily detected by a blue sensitive detector to provide an immediate readout of the potential ultraviolet radiation hazard from the unknown optical source.

16 Claims, 4 Drawing Figures

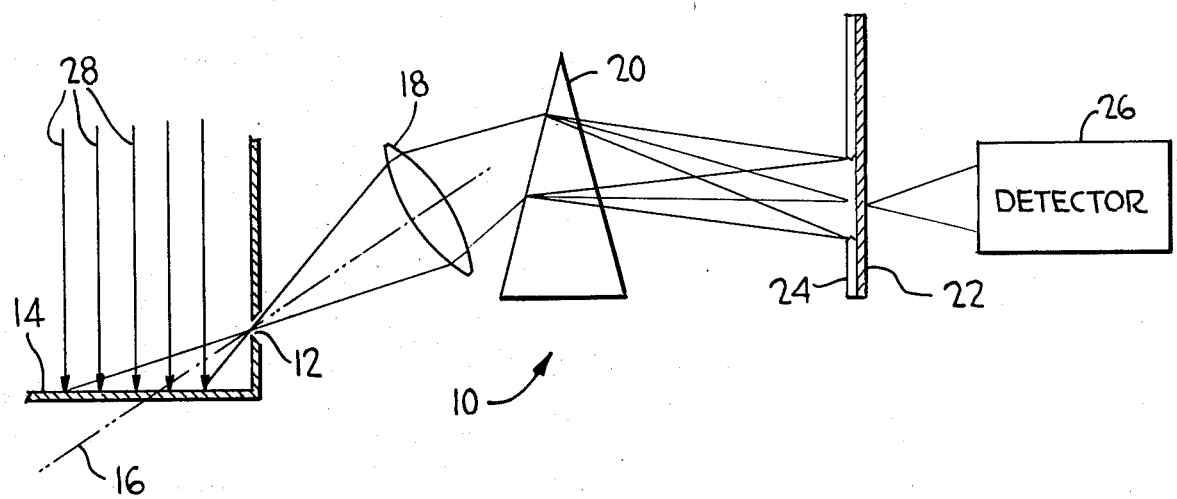
FIG. 1
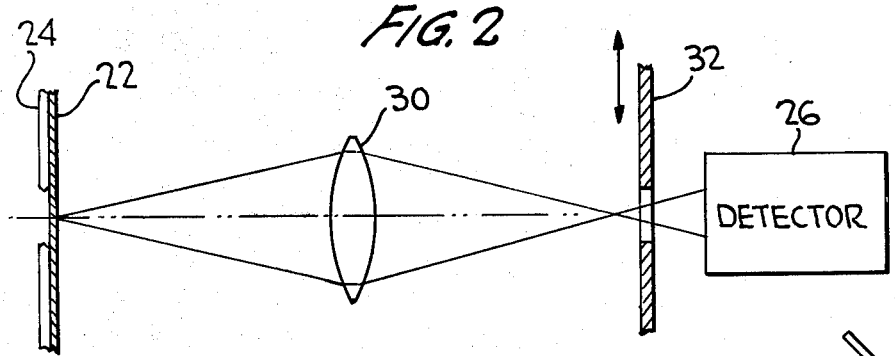
FIG. 2
FIG. 3
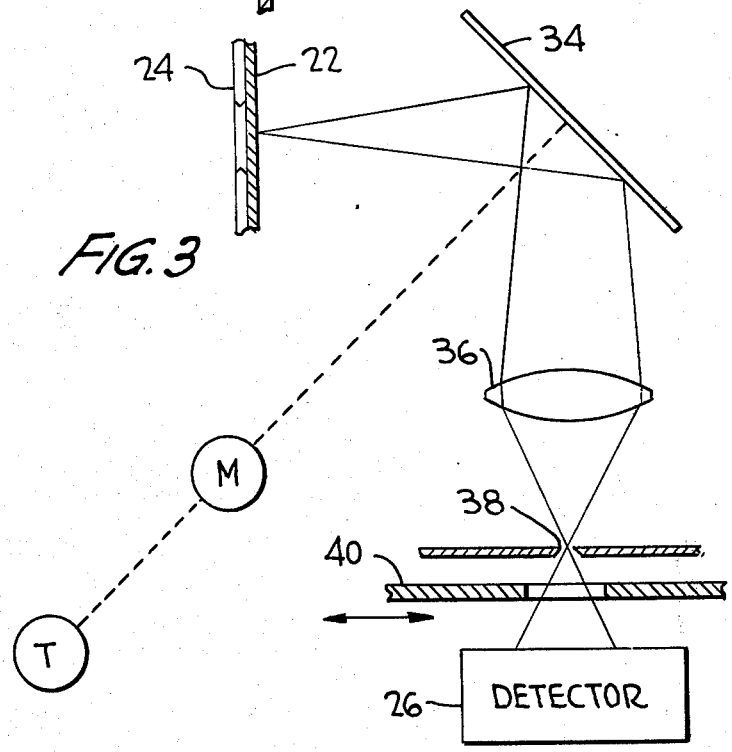

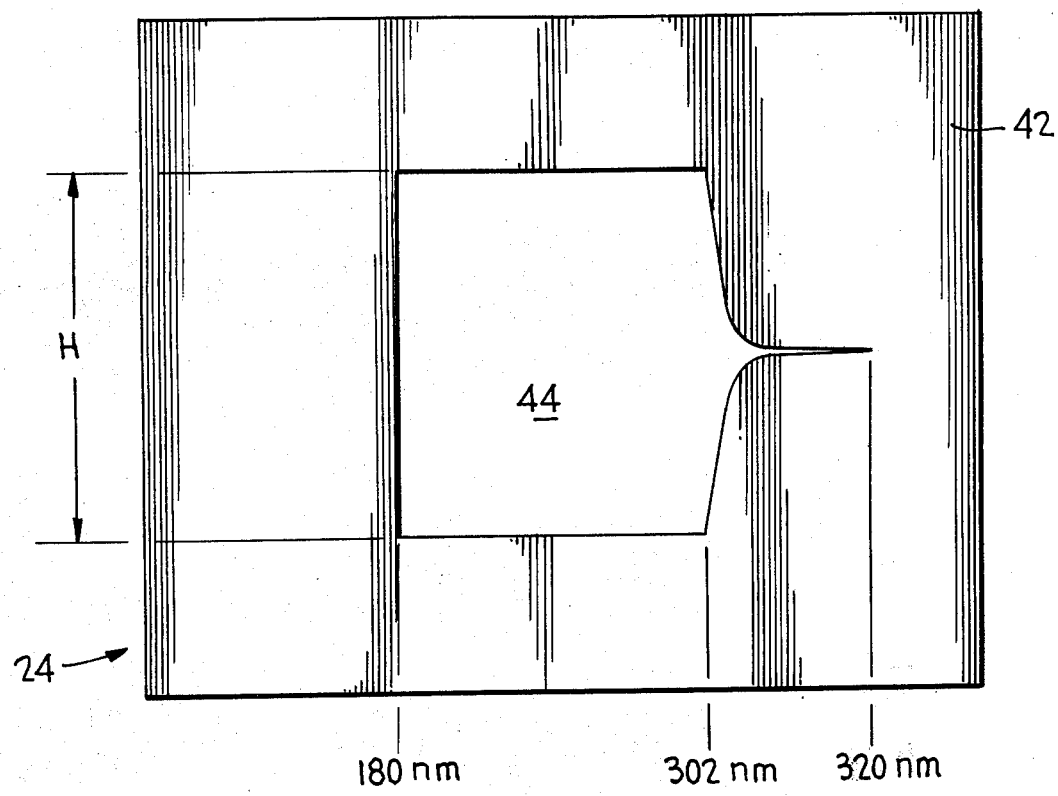

METHOD AND APPARATUS FOR MONITORING OPTICAL RADIATION

BACKGROUND OF THE INVENTION

1. Field of the Invention

This invention is related to a method and apparatus for monitoring optical radiation and, more particularly, to a method and apparatus for determining and monitoring hazardous ultraviolet radiation levels which may be emanating from optical radiation sources.

2. Description of the Prior Art

It is known that the deleterious biological effects to human beings which may be caused by exposure to ultraviolet radiant energy are highly wavelength dependent. That is, certain acute inflammatory skin reactions of humans are known to be caused by ultraviolet radiation of a certain wavelength range, while other biological effects result from ultraviolet radiation of a different wavelength. Further, some wavelengths of ultraviolet radiation have a markedly greater effect than other wavelengths.

Prior art ultraviolet hazard monitoring techniques have relied upon the utilization of conventional photodetector tubes for detecting the ultraviolet radiation, which have wavelength-dependent responses. In order to determine the energy per unit wavelength, the radiant energy is dispersed into a spectrum and the detector views only a portion of the spectrum at any one time. The results from such measurements must then be mathematically weighted in accordance with the biological effects curve, known as the action spectrum, in order to result in a biologically meaningful output. This procedure is to a great extent manual, tedious, time consuming, and prone to great error.

Accordingly, when designing a instrument for effective monitoring of such ultraviolet radiation, which may emanate from common electronic product sources, in order to detect hazardous levels, it is necessary not only to provide an instrument in which the intensity of the radiation is measurable but also one which weights its response according to any predetermined wavelength-dependent action spectrum to take into account biological effects. This is desirable in order that the output of the instrument provides a direct indication of the potential hazard from ultraviolet radiation present.

Prior art instruments have attempted to incorporate means for taking into account biological effects by shaping the response function of the wavelength-dependent detectors with fixed filters to match the shape of the biological effects response. The fabrication of such biologically weighted filters is extremely expensive since it is quite difficult to match the physical characteristics of such filters with the biological response desired. Further, any changes in the biological weighting to accommodate the various action spectra for deleterious biological effects, as well as any changes in the biological weighting as a result of new research, cannot easily or inexpensively be incorporated into such instruments. Since continuing biological experimentation results in increasingly refined wavelength-dependent biological response functions, it is quite important to be able to accommodate such updated data inexpensively and quickly.

OBJECTS AND SUMMARY OF THE INVENTION

It is therefore a primary object of the present invention to provide a simple and relatively inexpensive biologically weighted ultraviolet radiant energy monitor which provides a direct readout of the hazards to man from electronic product sources of ultraviolet radiant energy.

Another object of the present invention is to more broadly provide a method and apparatus for monitoring optical radiation which utilizes a mechanical means for biologically weighting an unknown source of optical radiation.

A still further object of the present invention is to provide a biologically weighted ultraviolet radiant energy hazard monitor whose wavelength-dependent response function may be easily and inexpensively adjusted to incorporate new data derived from continuing biological experimentation.

A still additional object of the present invention is to provide an ultraviolet radiation hazard monitor which is portable, extremely sensitive, versatile, and easily adjustable to provide varying readout capabilities in accordance with the particular portion of the ultraviolet spectrum of interest.

The foregoing and other objects are attained in accordance with one aspect of the present invention through the provision of an apparatus for monitoring optical radiation from a source thereof which comprises means for spectrally dispersing the radiation emitted from the source, means for masking a portion of the spectrally dispersed radiation in accordance with a predetermined biological weighting, and means for detecting the intensity of the portion of radiation passed by the masking means. In the preferred embodiment ultraviolet radiation hazard monitor, the spectral dispersion means preferably comprises a quartz prism or diffraction grating spectrograph for spatially separating and dispersing the ultraviolet radiation emitted from the source. A biologically weighted mechanical mask is placed in the exit plane of the spectrograph. The mask may be fabricated by photochemical etching techniques in order to provide transparent and opaque portions which are positioned and which are shaped in accordance with the biological action spectrum of interest and the spectral efficiencies of all components of the instrument. Thus, the mask respectively passes and attenuates those portions of the ultraviolet spectrum of interest and non-interest, respectively.

In accordance with another aspect of the present invention, a sodium salicylate coated plate is also placed in the exit plane of the spectrograph for converting the incident ultraviolet radiation to visible radiation in the blue. The sodium salicylate provides conversion of the ultraviolet at approximately unit quantum efficiency over the spectrum of interest, thereby obviating the necessity for a wavelength-dependent detector. With the sodium salicylate plate, a blue sensitive detector may be reliably and sensitively employed.

In accordance with a further aspect of the present invention, a method is provided for monitoring ulraviolet radiation from an unknown source of optical radiation which comprises the steps of spectrally dispersing the ultraviolet from the unknown source, mechanically masking a portion of the spectrally dispersed ultraviolet radiation in accordance with a predetermined biological weighting, and detecting the portion of the spectrally dispersed radiation which remains after the mechanical masking. The output from the detector provides a direct readout of the hazardous potential of the unknown source without the necessity for time-consuming data reduction or expensive electronic or filter components.

BRIEF DESCRIPTION OF THE DRAWINGS

Other objects, aspects, uses, and advantages of the present invention will become more fully apparent when considered in light of the following detailed description of the present invention considered in connection with the accompanying drawings, in which:

FIG. 1 illustrates a schematic side view of the elements comprising a first embodiment of the present invention;

FIG. 2 illustrates a modification of the detector portion of the first embodiment;

FIG. 3 illustrates a still further modification of the detector portion of the first embodiment of the present invention; and FIG. 4 illustrates an exemplary embodiment of a biologically weighted mask in accordance with the teachings of the present invention.

DETAILED DESCRIPTION OF THE PREFERRED EMBODIMENTS

Referring first to FIG. 1, a schematic side view of a preferred embodiment of the present invention is illustrated generally at 10. The incident radiant energy under observation is indicated generally by the reference numeral 28. This energy may be scattered by a diffuser 14 and enters the device of the present invention via a slit 12. Alternatively, the radiation may enter slit 12 along axis 16 either directly or through a suprasil quartz diffuser (not shown) positioned perpendicularly to axis 16.

Slit 12 is imaged onto a plate 22, to be described in more detail hereinafter, by means of a lens 18. Positioned intermediate lens 18 and plate 22 is a dispersing element shown for illustrative purposes as a simple quartz prism 20. Prism 20 is utilized to spatially separate and spectrally disperse the ultraviolet radiant energy, generally falling within the wavelength range of from approximately 180 to 340 nm., from the remaining portion of the radiant energy incident thereon.

Accordingly, impinging on plate 22 will be a spatially and spectrally dispersed spectrum of ultraviolet radiation.

Plate 22 is, in a preferred embodiment, transparent in the blue region of the electromagnetic energy spectrum and is coated with a thin layer of sodium salicylate. Significantly, sodium salicylate fluoresces in the blue with constant fluorescence quantum yield over the wavelength range from approximately 60 to 340 nm. with an efficiency that approaches unity for suitably prepared layers (see, for example, Allison and Burns, J.O.S.A., 55, 574, 1965). Plate 22 preferably comprises a glass or plastic medium which does not transmit radiant energy having wavelengths less than 400 nm. but which will efficiently transmit radiant energy of wavelengths greater than 400 nm. A suitable glass plate which meets the foregoing specifications is known as a Fish-Schurman Type GG 420 UV absorbing glass filter. It should be noted that the purpose of plate 22 is not only to provide a suitable substrate for the layer of sodium salicylate, but additionally to provide strong absorption of ultraviolet radiant energy below 400 nm. to ensure that no stray or scattered ultraviolet light will reach the detector. In addition, a simple band pass filter, which is highly transmissive in the blue region of the spectrum only, or a filter such as a Corning 5562 glass filter could be added behind the plate 22 to eliminate stray visible and infrared radiation which might otherwise reach the detector. Additionally, for greater durability, a suprasil quartz plate may be placed over plate 22 to sandwich the sodium salicylate surface in the middle. The two plates may be cemented together at the edges thereof after the space therebetween has been evacuated. The suprasil quartz plate (not shown) would be placed towards the incoming radiation since it transmits ultraviolet radiant energy down to a wavelength of approximately 180 nm.

Accordingly, the ultraviolet radiant energy incident on plate 22, already having been dispersed and spectrally separated, causes the sodium salicylate coated screen 22 to fluoresce in the blue in the exit plane of a prismatic element 20 at a constant quantum efficiency as a function of wavelength. Since plate 22 emits only blue light, detector 26 need only comprise a common blue sensitive detector, such as a photodiode, a photomultiplier tube, or the like. Thus, the drawback in prior art ultraviolet hazard monitoring instruments with respect to wavelength-dependent detectors is dispensed with according to the present invention inasmuch as detector 26 is looking only at a narrow wavelength band. The output of detector 26 will be an indication of the intensity of the ultraviolet radiation in incident beat 28, no account having yet been taken of the biological weighting factor.

In order to take into account the biological effects discussed above, a novel biologically weighted mask 24 is placed in front of plate 22. Basically, the spectrally dispersed ultraviolet radiation is physically masked by a mechanical mask 24 to restrict the light flux resulting from the incident ultraviolet radiation in accordance with the wavelength-dependent response function deemed desirable by the user. The spectrally dispersed ultraviolet radiation may be masked at any point, corresponding to a point on plate 22 (a particular wavelength) which displays the converted blue radiation resulting from the unknown ultraviolet containing incident radiation 28.

Mask 24 may be fabricated by any of a number of well-known photochemical etching techniques. An example of a typical mask, preferably utilized with a diffraction grating type spectrograph, is depicted in FIG. 4 and is seen to comprise an opaque portion 42 and a transparent portion 44. Opaque portion 42 is designed to block ultraviolet radiation corresponding to those wavelengths of the ultraviolet which are of little biological significance, whereas on the other hand transparent portion 44 permits the ultraviolet radiation of the most significant wavelengths to pass through the mask unattenuated according to the desired action spectrum. The design of mask 24, with respect to the shape of the opaque and transparent portions, depends on the particular response function desired for the biological system under investigation. In other words, a useful wavelength-dependent response function would be that function derived from biological experimentation which will cause the monitor to respond with a sensitivity similar to the biological system under investigation.

With respect to the particular design of mask 24 illustrated in FIG. 4, it can be seen that the largest "window" of interest occurs between approximately 180 nm. and 302 nm. on the ultraviolet spectrum. Between approximately 302 nm. and 320 nm. the radiation is attenuated which indicates a lessening of biological interest with respect to those particular wavelengths. Below 180 nm. and above 320 mm., any radiation will be completely masked and will therefore not contribute to the final reading. The height H of mask 24, typically on the order of 10 mm., is chosen for convenience so as to fit the remaining instrumentation. The overall dimensions of the mask shown in FIG. 4 is approximately 18 x 22 mm. The particular mask illustrated in FIG. 4 assumes that the instrument with which it is utilized is uniformly transmitting over the wavelength region from 180 nm. through 320 nm. If, for some reason, the instrument's transmissivity varies as a function of wavelength, the shape of the mask may be modified accordingly. For nonlinear dispersing elements such as a prism, the wavelength scale will accordingly be nonlinear.

Referring back to FIG. 1, the mechanical biologically weighted mask 24 is located directly in front of the sodium salicylate plate 22 in the exit plane of the quartz prism spectrograph 20. Alternatively, mask 24 could be located behind plate 22. The effect of the placement of mask 24 in either location is such that the blue fluorescence emitted by plate 22 and detected by blue sensitive detector 26 follows the envelope of the particular action spectrum for adverse threshold effects of ultraviolet radiant energy.

As mentioned above, the relative spectral response of the blue sensitive detector 26 is not significant in the preferred embodiment inasmuch as the sodium salicylate plate 22 has a constant quantum efficiency over the wavelength region of interest in the ultraviolet.

The versatility of the present invention becomes apparent when one considers the ease with which the biologically weighted mask 24 may be fabricated and the low cost incident to the replacement thereof when compared with prior art techniques for biologically weighting such instruments or the output readings thereof. Specific masks may be developed to view certain phenomena of interest such as, for example, the carcinogenic potential of radiation between specified wavelengths.

Furthermore, in a mechanical mask of the nature described, one can take into account any peculiarities which may arise in the transmission characteristics of the optical spectrum. For example, if for some reason one did not desire to use a sodium salicylate plate, mask 24 could be designed to correct for changes in the spectral efficiencies of all components of the instrument. In other words, plate 22 is not essential to the instant inventive concept, but simply renders easier the design of mask 24. Further, the presence of the sodium salicylate plate allows a less expensive and more sensitive blue responsive detector to be utilized.

Several alternative detection modes are readily apparent. With respect to FIG. 1, the output of detector 26 simply comprises a measure of ultraviolet hazard. FIG. 2 depicts an alternative detection mode which comprises a focusing lens 30, a range filter 32, and a suitable blue sensitive detector 26. In this embodiment, the blue fluorescence is focused by lens 30 through range filter 32 onto the sensitive area of detector 26. With this embodiment, it is only possible to determine the total energy transmitted by the biologically weighted mask.

Referring now to FIG. 3, the components of an alternative detection embodiment comprise a rotating mirror 34, a wavelength transducer T and motor drive M, a focusing lens 36, a slit 38, a range filter 40, and the blue sensitive detector 26. In this embodiment, the blue fluorescence is imaged by rotating mirror 34 and lens 36 through range filter 40 and through sit 38 onto detector 26. The spectral information is determined from the detector output as a function of the position of mirror 34 as determined by the wavelength transducer T which is coupled to motor M that, in turn, drives mirror 34. Additionally, if information concerning only the total energy is desired, the output of detector 26 may be integrated electronically for a single sweep at constant speed of the output blue fluorescence from screen 22 by mirror 34.

It will be appreciated by a person of ordinary skill in the art that the principles underlying the ultraviolet radiation hazard monitor of the preferred embodiment of the present invention described hereinabove may be extended to other areas of the electromagnetic spectrum with equally advantageous results. For example, in the visible spectrum, one could utilize a detection device according to the present invention in connection with phototherapy treatments which are commonly used to treat neo-natal jaundice. In other words, a device built according to the principles of the present invention could be utilized to measure, on a periodic basis, the intensity of the radiation in the effective radiation band utilized in the phototherapy treatment, which occurs in the blue portion of the visible spectrum. When the intensity of the wavelengths of interest drops below a certain level, as detected by the present invention, the bulbs in the unit should be changed in order to ensure maximum treatment effectiveness.

It should be readily apparent that a device according to the present invention may be utilized in any application where the inquiry concerns the presence or absence of a particular wavelength or wavelengths of light and the magnitude or intensity thereof. The biologically weighted mask could be fabricated from experimental data for such applications. It is also feasible that a device similar to the one described above could be utilized in a non-hazardous environment to measure, for example, ordinary illuminance.

Many modifications and obvious variations of the present invention will be apparent to those skilled in the art. We therefore wish it to be understood that we do not desire to be limited to the exact details of construction shown and described.

We claim as our invention:

1. Apparatus for monitoring radiation from a source thereof to which a biological system may be exposed, said radiation having a known effect on said biological system, which comprises:

means for spectrally dispersing the radiation emitted from said optical radiation source;
   means for masking a portion of the output of said spectral dispersion means in accordance with a predetermined wavelength-dependent sensitivity similar to the biological system desired; and
   means for detecting the intensity of the portion of radiation passed by said masking means.

2. The optical radiation monitor as set forth in claim 1, wherein said masking means comprises mask having transparent and opaque portions positioned thereon in accordance with said predetermined wavelength-dependent sensitivity.

3. The optical radiation monitor as set forth in claim 2, wherein said means for spectrally dispersing the radiation emitted from said optical radiation source comprises a quartz prism spectrograph means for spatially separating the ultraviolet radiation emitted from said source from the remaining portion of said radiation.

4. The optical radiation monitor as set forth in claim 3, further comprising fluorescent means positioned in the exit plane of said quartz prism spectrograph for converting said ultraviolet radiation to visible radiation in a narrow wavelength band.

5. The optical radiation monitor as set forth in claim 4, wherein said mask is placed adjacent said fluorescent means in the exit plane of said quartz prism spectrograph.

6. The optical radiation monitor as set forth in claim 4, wherein said fluorescent means has approximately unit quantum efficiency over the ultraviolet spectrum.

7. The optical radiation monitor as set forth in claim 4, wherein said converting means comprises a plate transparent in the blue region of the spectrum and coated with sodium salicylate.

8. The optical radiation monitor as set forth in claim 7, wherein said detecting means comprises a blue sensitive detector.

9. The optical radiation monitor as set forth in claim 2, wherein said means for spectrally dispersing the radiation emitted from said optical radiation source comprises a diffraction grating type spectrograph means for spatially separating the ultraviolet radiation emitted from said source from the remaining portion of said radiaton.

10. The optical radiation monitor as set forth in claim 9, wherein said mask is placed adjacent said fluorescent means in the exit plane of said diffraction rating type spectrograph.

11. The optical radiation monitor as set forth in claim 9, further comprising fluorescent means positioned in the exit plane of said diffraction grating type spectrograph for converting said ultraviolet radiation to visible radiation in a narrow wavelength band.

12. The optical radiation monitor as set forth in claim 11, wherein said converting means comprises a plate transparent in the blue region of the spectrum and coated with sodium salicylate.

13. The optical radiation monitor as set forth in claim 12, wherein said detecting means comprises a blue sensitive detector.

14. A method for monitoring ultraviolet radiation from an unknown source of optical radiation, which comprises the steps of:
spectrally dispersing ultraviolet radiation from said unknown source of optical radiation;
mechanically masking a portion of said spectrally dispersed ultraviolet radiation in accordance with a predetermined biological weighting thereof; and
detecting the portion of said spectrally dispersed ultraviolet radiation remaining after said mechanical masking step.

15. The method as set forth in claim 14, further comprising the steps of converting said spectrally dispersed optical radiation to visible radiation by directing same through a fluorescent plate.

16. The method as set forth in claim 15, wherein said fluorescent plate comprises a plate coated with sodium salicylate and wherein said detecting step is achieved by utilizing a blue sensitive detector.

* * * * *